United States Patent [19]

Gibson

[11] Patent Number: 4,570,125
[45] Date of Patent: Feb. 11, 1986

[54] FSK DEMODULATOR WITH CONCURRENT CARRIER AND CLOCK SYNCHRONIZATION

[75] Inventor: Rodney W. Gibson, Burgess Hill, England

[73] Assignee: U.S. Philips Corporation, New York, N.Y.

[21] Appl. No.: 509,822

[22] Filed: Jun. 30, 1983

[30] Foreign Application Priority Data

Jul. 2, 1982 [GB] United Kingdom ............... 8219173

[51] Int. Cl.$^4$ .......................... H03D 3/18; H03D 3/20
[52] U.S. Cl. ...................................... 329/50; 329/122;
329/126; 375/81; 375/82; 375/95; 375/120
[58] Field of Search ................. 329/50, 122, 124, 126,
329/136; 375/81, 82, 88, 89, 90, 94, 95, 110,
120; 331/12, 23

[56] References Cited

U.S. PATENT DOCUMENTS

| 3,600,700 | 8/1971 | Matsuo | 329/124 X |
| 3,863,156 | 1/1975 | Bogert | 375/81 |
| 3,934,205 | 1/1976 | Bogert | 375/81 |
| 4,419,759 | 12/1983 | Poklemba | 329/50 X |
| 4,472,817 | 9/1984 | Poklemba et al. | 329/50 X |

FOREIGN PATENT DOCUMENTS 0625922  10/1981  Fed. Rep. of Germany ........ 331/12

Primary Examiner—Eugene R. LaRoche
Assistant Examiner—D. C. Mis
Attorney, Agent, or Firm—Joseph P. Abate

[57] ABSTRACT

A data demodulator for digital signals in which the times of the zero crossings in hard limited signals in the orthogonal outputs (I and Q) of a direct demodulation receiver are used to recover the carrier and clock signals.

11 Claims, 17 Drawing Figures

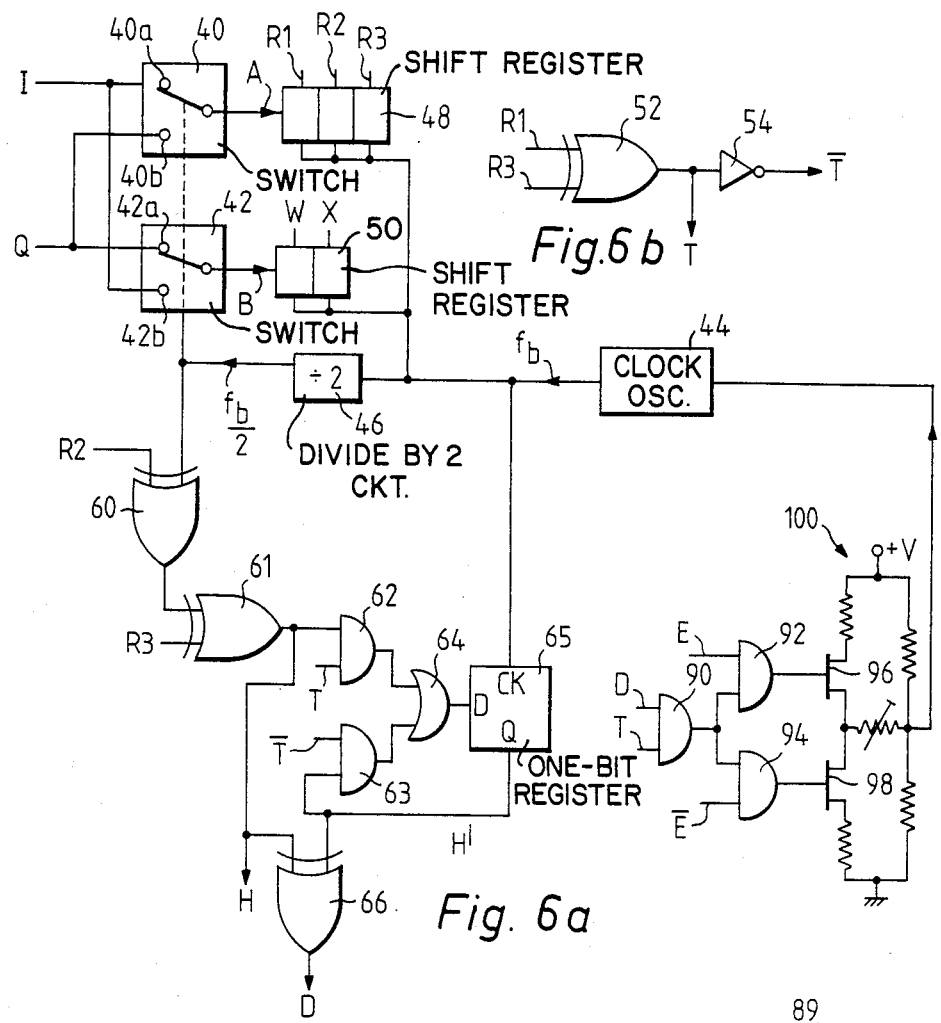
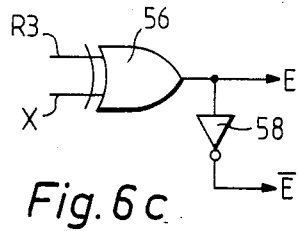
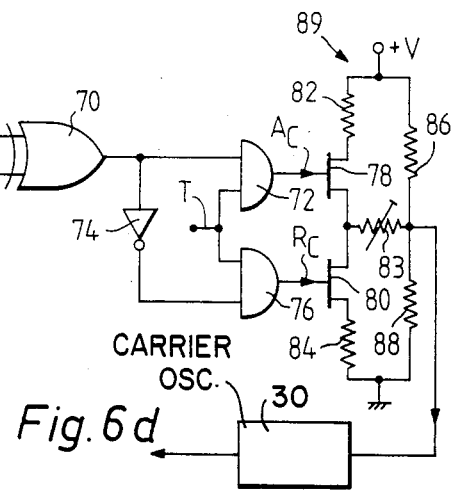
Fig. 6a
Fig. 6b
Fig. 6c
Fig. 6d

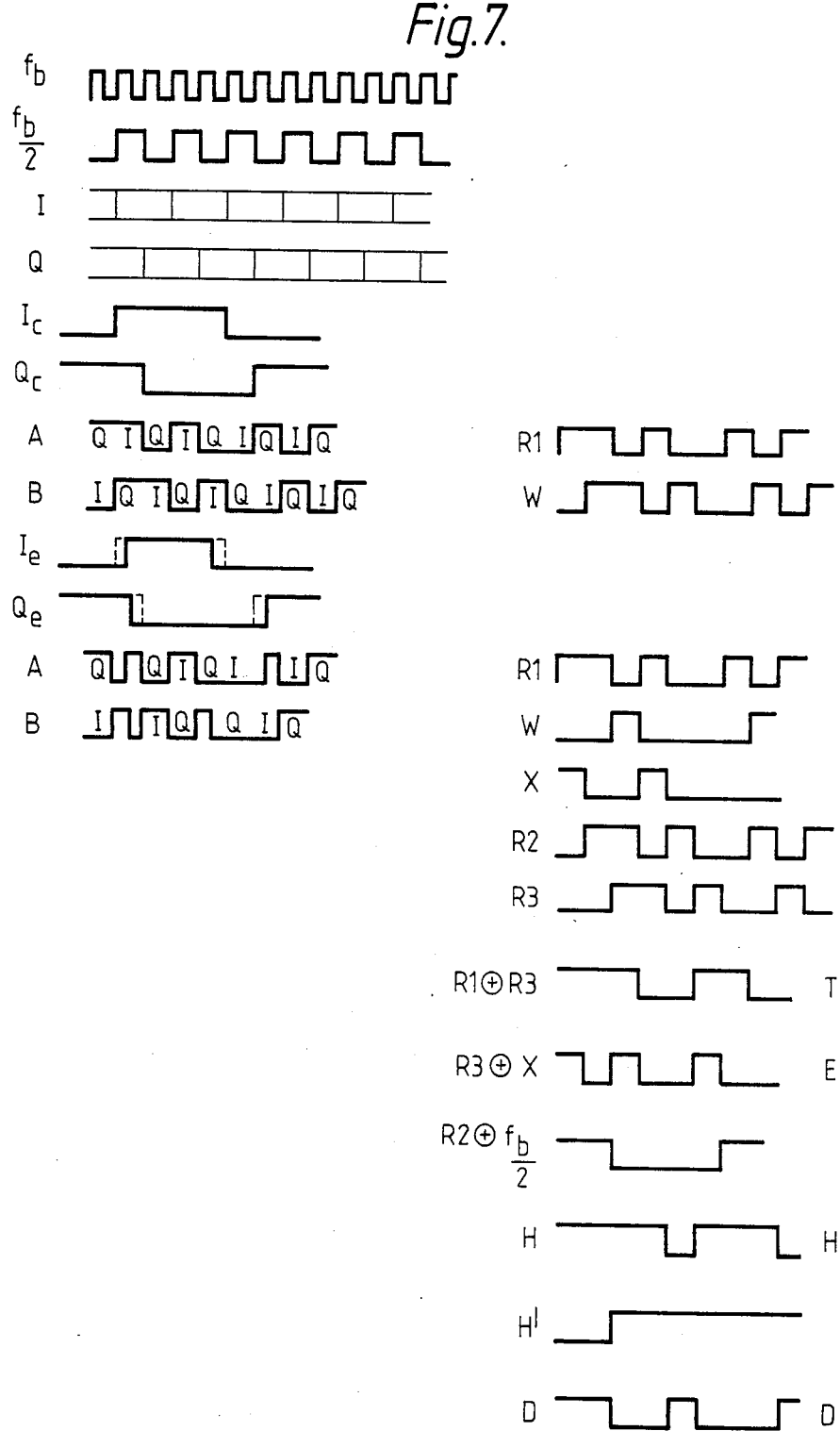

FSK DEMODULATOR WITH CONCURRENT CARRIER AND CLOCK SYNCHRONIZATION

BACKGROUND OF THE INVENTION

The present invention relates to a digital data demodulator which is particularly, but not exclusively, suitable in MSK, TFM and GMSK signalling.

In frequency shift keying (FSK), a carrier signal $f_c$ is frequency modulated by a deviation frequency, for example $+\Delta f$ for a "1" and $-\Delta f$ for a "0". The digital data can be recovered by quadrature mixing $f_c \pm \Delta f$ with a local oscillator frequency of $f_c$ and low pass filtering, one channel (I) will produce the in-phase signal $+\Delta f$ or $-\Delta f$ and the other channel (Q) will produce the quadrature signal $+\Delta f - \pi/2$ or $-\Delta f + \pi/2$, respectively.

By comparing the filtered signals, one can determine the relative phase of the signal. If it leads by 90° then it is, for example, a "1" and if it lags by 90° then it is, for example, a "0".

This comparison can be done by hard limiting the respective signals and applying them to a D-type flip-flop—one as a strobe input and the other as the D input—see, for example, British Patent Specification No. 2,032,737A. Thus, a phase change indicates a transition from a "1" to "0" or vice versa. However, there is an acquisition delay. The delay can be reduced by having two D-type flip-flops, the D-inputs being connected to the respective I and Q channels and their clock inputs being connected to the channel not connected to their D-inputs. While this known technique may be satisfactory for FSK signalling it is not suitable for faster signalling rates as occurs in FFSK. Additionally, this known technique does not indicate how one can cope with the problem of the local oscillator frequency and the input carrier frequency being different which can lead to distortion of the signals. Accordingly, it is desirable to be able to adjust the local oscillator frequency so that it can track changes in the received carrier signal, in which case it is necessary to recover the carrier signal.

SUMMARY OF THE INVENTION

According to the present invention there is provided a demodulator for digital signals including means for deriving correction signals for clock and carrier oscillators by comparing times of zero crossings at outputs of two orthogonal channels with nominal times at which these crossings should occur.

In the present invention, the clock and carrier recovery is from the hard limited outputs of the quadrature channels I (in phase) and Q (quadrature phase). The only information available at these outputs is contained in the times of the zero crossings.

The demodulator made in accordance with the present invention has been found to give a good bit error rate relative to the signal-to-noise ratio and to achieve a fast acquisition which is of particular importance in data transmissions to mobile receivers.

In an embodiment of the present invention, the two orthogonal channels are formed by the outputs of a direct demodulation receiver having a local oscillator generating the carrier signal.

The demodulator may further include means for determining the occurrence of the zero crossings at the outputs of the two orthogonal channels and means for applying subsequent corrections to one or both of the clock and carrier oscillators. The correction applying means may apply phase corrections in the form of fixed nudges related to the time errors in the zero crossings or phase corrections of a size related to the time errors in the zero crossings, otherwise known as proportional nudges.

If desired, the correction applying means may include means for advancing or retarding the carrier oscillator according to the following function of variables in one channel: if the zero crossing is early and (1) the deviation frequency is low, advance, or (2) the deviation frequency is high, retard, if the zero crossing is late and (3) the deviation frequency is low, retard, or (4) the deviation frequency is high, advance;

and the inverse of these rules for zero crossings in the other channel.

The correction applying means may include means for advancing and retarding one or both of the clock and carrier oscillators only if the zero crossing corresponds to a deviation frequency of the opposite sign compared with that corresponding to the previous correction.

BRIEF DESCRIPTION OF THE DRAWINGS

The present invention will now be described, by way of example, with reference to the accompanying drawings, wherein:

FIGS. 6a–6d illustrate schematically a demodulator circuit which can apply phase corrections for errors in carrier and/or clock frequencies in fixed amounts (otherwise termed fixed nudges), FIG. 7 shows diagrammatically a series of waveforms which serve to facilitate the understanding of the operation of the demodulator circuit shown in FIGS. 6a–6d.

DESCRIPTION OF THE PREFERRED EMBODIMENTS

Figure 1:
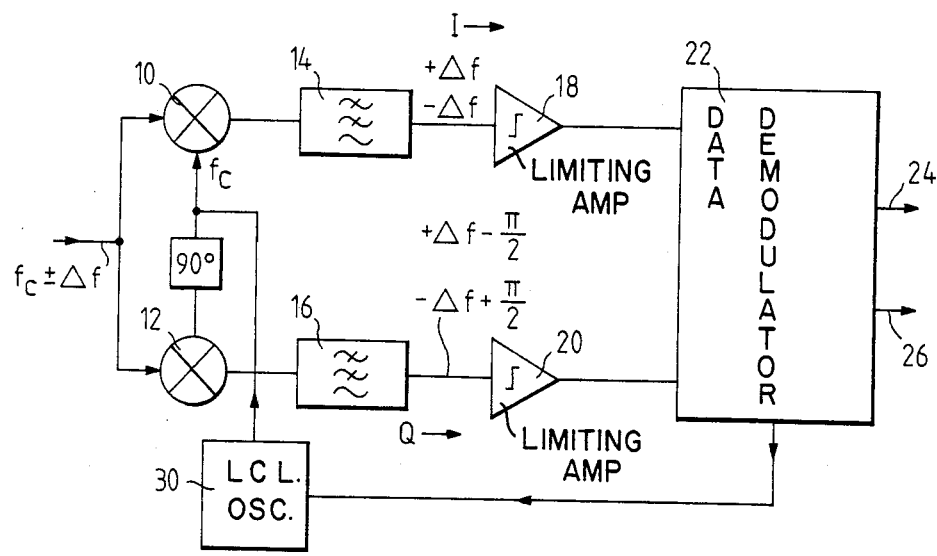
FIG. 1 is a block schematic circuit of an embodiment of a baseband receiver and demodulator made in accordance with the present invention.

Referring to FIG. 1, a frequency modulated, differentially encoded input signal $f_c \pm \Delta f$ is applied to quadrature mixers 10, 12 to which a carrier frequency $f_c$ is applied from a local oscillator 30. The outputs of the mixers 10, 12 are filtered in low pass filters 14, 16 which will pass the deviation frequency $\Delta f$ and preserve the phase of the modulating frequency. Thus, in the in-phase channel I the signal is $+\Delta f$ or $-\Delta f$, and in the quadrature channel Q the signal is $+\Delta f - \pi/2$ or $-\Delta f + \pi/2$. In this embodiment, $f_c$ is 900 MHz and the deviation frequency Δf is a quarter of the bit rate, e.g. for a bit rate of 16 Kb/s then Δf is 4 kHz or fb/4.

In order to resolve the phase of the signals in the I and Q channels, the outputs of the filters 14, 16 are hard limited in limiting amplifiers 18, 20 and, thereafter, the signals are applied to a data demodulator 22. Demodulator 22 includes means for recovering the data and the clock signals which are provided on outputs 24, 26, and means for providing a carrier control signal which is applied to the local oscillator 30.

In the method described, it is necessary that a carrier oscillator 30 and a clock signal generator (not shown) are pulled quickly into phase lock with the incoming signal otherwise data will be lost.

In the circuit in accordance with the present invention, the phase of the carrier and clock signals is determined from the information contained in the times of the zero crossings at the hard limiter outputs.

Figure 2:
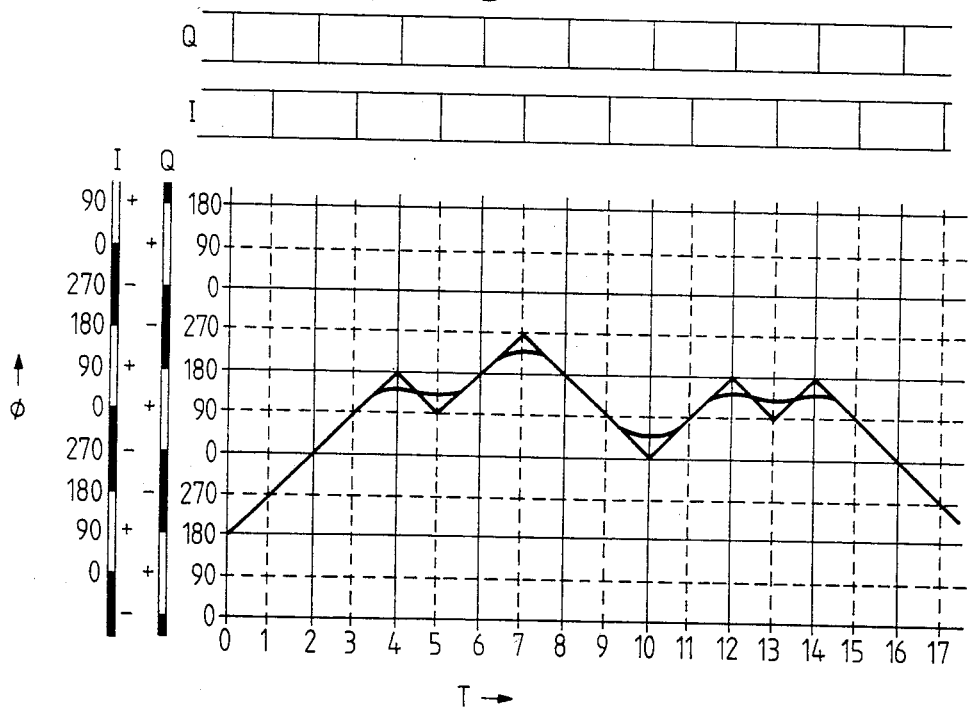
FIG. 2 is a phase trajectory of a signal having correct carrier and clock phases.

FIG. 2 is a phase-time diagram of an MSK signal. In FIG. 2, the ordinate represents phase $\phi$ and the abscissa represents time T. The solid vertical lines correspond to the transitions in the hard limited Q signal and to the centers of the eyes of the hard limited I signal, and the broken vertical lines correspond to the transitions in the hard limited I signal and to the centers of the eyes of the hard limited Q signal. The difference in time between a vertical solid line and the next following broken line (and vice versa) is one bit period that is 1/fb.

The horizontal solid lines correspond to a phase shift of 180° in the Q signal and the horizontal broken lines a phase shift of 180° in the I signal. Thus, there is a 90° phase difference between successive pairs of horizontal lines, this phase shift corresponding to the difference between the I and Q channels. If a convention is adopted of a "1" comprising a phase lead of 90°, and a "0" comprising a phase lag of 90° then during the first four bit periods there is a succession of four "1"s followed by a single "0", two "1"s, three "0"s and so on. The diagram shows in straight lines and sharp angles the phase trajectory for MSK (Minimum Shift Key) with no bandwidth restrictions. However, the invention is equally applicable to TFM (tamed FM) and GMSK (Gaussian Minimum Shift Key) which is shown as a smoothed curve. FIG. 2 shows the situation where the carrier and clock signals are in the correct phase with the phase trajectory passing through the intersections of the vertical and horizontal lines.

Figure 3:
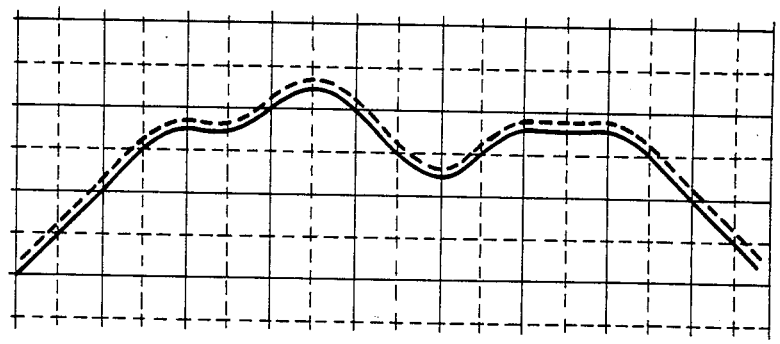
FIG. 3 shows in broken lines a phase trajectory in which there is a carrier phase error.

FIG. 3 illustrates the situation where there is a carrier phase error, for example the carrier phase is leading its correct position. In this case as shown in broken lines, the zero crossings of the phase lines are early for a "1" and late for a "0". If the carrier is lagging, then the zero crossings are late for a "1" and early for a "0". Thus, a carrier phase error can be detected by determining if the zero crossings are early and late or late and early depending on the nature of the error.

Figure 4:
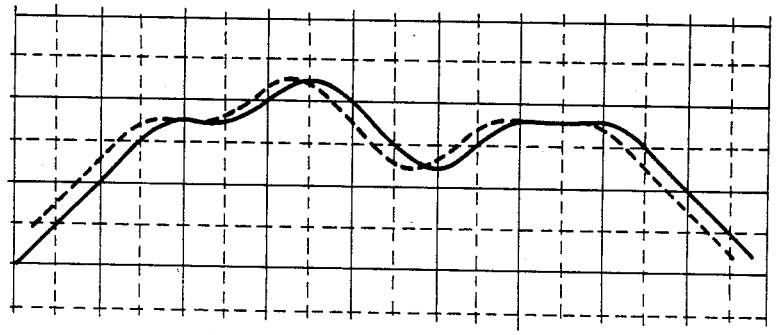
FIG. 4 shows in broken lines a phase trajectory in which there is a clock phase error.

The broken line waveform in FIG. 4 illustrates error in clocking. More particularly, the drawing illustrates the case where the clock phase is late so that the zero cross-overs for both "1"s and "0"s are early. In the case of the clock phase being early, the zero crossings in both "1"s and "0"s are late. Thus, an error in clock phase can be detected if all the zero crossings are early or late depending on the nature of the error.

Figure 5:
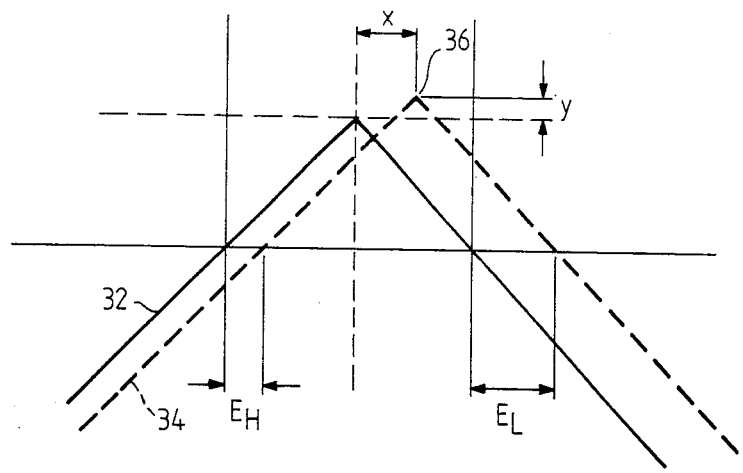
FIG. 5 shows in broken lines a phase trajectory which has both carrier and clock phase errors.

FIG. 5 illustrates in full lines a portion of a phase trajectory 32 which is in-phase and in broken lines a portion of a phase trajectory 34 in which there are carrier and clocking errors. These errors can be identified by the fact that the sharp-angled peak 36 of the trajectory is above the phase line and to the right of the clock line. Although the zero crossings of the trajectory 34 are both late, the time differences $E_L$ and $E_H$ are not equal. More particularly, the clock is running early by the time x and the carrier oscillator phase is early by y.

The error observed in the zero crossings depends on the slope of the trajectory, i.e. on whether the instantaneous frequency is higher or lower than the carrier. From FIG. 5:

$$E_H = x - y,$$

$$E_L = x + y,$$

wherein $$x = (E_L + E_H)/2,$$

$$y = (E_L - E_H)/2.$$

Therefore, in principle, on a noise-free MSK signal, one would only need one high-frequency transition and one low-frequency transition to set the phase of both the carrier and clock oscillators. What is more, this can be done in two simple steps as follows:

Assuming the errors x and y as above.

If the first transition is due to a low frequency, then we measure $E_L = x + y$. Subtract a phase correction of $(x+y)/2$ from both clock and carrier oscillators, then:

$$x \rightarrow (x-y)/2$$

$$y \rightarrow (y-x)/2$$

Any subsequent low frequency transition sees a zero error:

$$E_L = (x-y)/2 + (y-x)/2 = 0$$

but the next high frequency transition sees:

$$E_H = (x-y)/2 - (y-x)/2 = x - y$$

A correction of $(x-y)/2$ is applied to the clock and $-(x-y)/2$ applied to the carrier, giving zero residual error to both.

In practice, on a noisy signal, corrections are not normally applied in full but only a fraction of it. The process will then converge on the desired position. The optimum strategy will depend on what compromise between error performance and acquisition time it is desired to adopt and also on the relative stabilities of the carrier and clock oscillators. For instance, it may be known that the clock oscillator is accurate to 100 ppm (parts per million), so that once the acquisition period is complete, the clock phase should only be adjusted very slightly. On the other hand, the carrier could be a 900 MHz oscillator, in which case the phase drift in the output of the I and Q channels for a 5 ppm frequency error would be 4500 Hz.

The corrections to the phase of the clock and carrier oscillators can be derived from the following rules:

(a) Clock

If a transition is early, advance the clock (because it is late).

If a transition is late, retard the clock (because it is early).

(b) Carrier

In this case, one uses the same rule as above or its inverse according to whether the transition was due to a high or low deviation frequency, that is $+\Delta f$ or $-\Delta f$. The rule is thus:

| Transition | Frequency | Action |
|---|---|---|
| Early | Low | Advance |
|  | High | Retard |
| Late | Low | Retard |
|  | High | Advance |

Whether a transition corresponds to a high or low frequency can be determined by observing the sign on the other channel. Assume that the carrier fed to the Q channel mixer lags that fed to the I channel by 90°. Then the following rules apply:

|  | Transition | Sign of Other Channel |
|---|---|---|
| High Frequency | I ⎍ | + |
|  | I ⎑ | − |
|  | Q ⎍ | − |
|  | Q ⎑ | + |
| Low Frequency | I ⎍ | − |
|  | I ⎑ | + |
|  | Q ⎍ | + |
|  | Q ⎑ | − |

Notice that the rules are reversed as between the I and Q channels. The rules can be deduced from considering the vertical phase lines I and Q at the left hand side of FIG. 2. Assume that white is high data signal and black is low data signal.

Since, in many cases, the carrier phase will need more frequency correction than the clock, the following strategy can be adopted:

For each transition detected in either the I or Q outputs:
(a) Determine whether the transition is early or late, then
  (i) always adjust the carrier phase so as to reduce the error,
  (ii) only adjust the clock phase if the transition corresponds to a frequency "different" from that of the previous transition ("different" meaning above-the-carrier as compared with below-the-carrier).

This rule ensures that a relatively stable clock oscillator will not be unduly disturbed by carrier phase fluctuations.

The above-mentioned rules can be implemented using the demodulator arrangement shown in FIGS. 6a-d which arrangement adjusts the carrier and clock phases in fixed amounts, otherwise known as "fixed nudges" or by the demodulator arrangement shown in FIG. 8a-f which arrangement adjusts the respective phases in nudges proportional to the errors in the transition times.

Referring to FIG. 6, it is first necessary to de-interleave the signals in the I and Q channels. This is done using two change-over switches 40, 42 (or their electrical equivalents). The I channel is connected to the contacts 40a and 42b and the Q channel is connected to the contacts 40b, 42a.

The switches 40, 42 are actuated in phase at half the bit rate $f_b/2$, which signal is produced by a clock oscillator 44, which generates the clock signal $f_b$, and a divide-by-two circuit 46. The output A of the switch 40 is connected to the data input of a three-stage shift register 48; the stages have outputs R1, R2 and R3. The output B of the switch 42 is connected to a two-stage shift register 50; the first and second stages have outputs W and X, respectively. Both shift registers 48, 50 are clocked at the bit rate $f_b$. The I channel is strobed into the register 48 just before the half clock signal $f_b/2$ goes from high to low and the Q channel is strobed into the register 48 just before the half clock signal goes from low to high. More particularly, data is strobed into the register 48 when the clock goes high and this will be controlled so as to correspond to the center of an "eye" in the hard limited signal. Any transition in either channel should then occur just as its value is strobed into the register 50. The register 48 will hold the last three bits which have been strobed in the eye centers while the register 50 will hold the last two bits which have been strobed at the eye transitions. It should be noted that at any one time one of the two registers 48, 50 is receiving data from the I channel while the other of these two registers is receiving data from the Q channel.

Having described the de-interleaving arrangement shown in FIG. 6a, an example of its operation will be described with reference to some of the waveform diagrams of FIG. 7. On the left-hand side of the waveforms in FIG. 7, the references indicate where the signals are derived from or the operation which has been carried out to obtain the waveform shown. On the right-hand side of some of the waveforms are the references to the signals which are used by the logic circuits to adjust the carrier and clock phases in fixed nudges. The eye diagrams show the hard limited signals with perfect timing. Below them is an example of a signal without perfect timing, the transitions in the Q channel lagging the I channel by one clock period. For convenience of reference, the I and Q signals have been referenced $I_c$ and $Q_c$. The outputs A and B of the de-interleaving switches 40 and 42 are shown and for convenience the letters I and Q have been inserted to show which of the channels I and Q is contributing to the respective outputs at a particular instant. To the right of the waveforms A and B are shown respectively the outputs R1 and W of the registers 48 and 50 which are strobed on the rising transition of the clock signal $f_b$. A low to high transition in outputs A and B is treated as a "zero" or low and a high to low transition is treated as a "one" or high.

The next lower waveforms in FIG. 7 are the I and Q signals with timing errors, referenced $I_e$ and $Q_e$. In the case of the waveform $I_e$ the low to high transition is late and the high to low transition is early, the perfect timing positions being shown in broken lines. Additionally, the high to low transition of the $Q_e$ waveform is early while the low to high one is late. The corresponding outputs A and B of the switches 40 and 42, respectively, include the timing errors whenever they occur during the half clock frequency period that the switch is connected to that channel. Comparing output R1 for the correct signal with that of the output R1 for the signal with timing errors it will be noticed that the data signal is the same. However, a similar comparison of the W signals shows differences between them. This can be explained by the fact that, in strobing the signals into the register 48, the late transitions of $I_e$ and $Q_e$ do not affect the data stored whereas the early transitions are ignored because the output A is connected at that instant to the other of the I and Q channels. In the case of the register 50, the early transitions of I and Q are registered as "0"s rather than "1"s whereas the late transitions are ignored because the output B is connected at that instant to the other of the I and Q channels.

The following description of the operation of FIG. 6 relates to the processing of the $I_e$ and $Q_e$ signals with the timing errors shown.

The data strobed into the registers 48 and 50 enables the following information to be determined, which information can be used to carry-out the aforementioned rules: a transition indication (T), whether the transition is early (E) or not early ($\bar{E}$), whether it is a high frequency signal (H), and if it was of a different frequency to the previous transition (D).

Referring to FIGS. 6b and 7, the indication of a transition (T) can be determined using an Exclusive-OR (Ex-OR) gate 52 having two inputs connected respectively to the outputs R1 and R3 of the register 48 of FIG. 6a. It will be realized from the operation of the switches 40 and 42 that the output R1 relates to the data bit last stored and the previous bit in the same channel is on the output R3. Thus, if the outputs R1 and R3 are different, the Ex-OR gate 52 of FIG. 6b will produce a high output indicative of a transition T. If the outputs are the same, the gate 52 will not produce a high output. The waveform identified R1⊕R3 illustrates the output of the Ex-OR gate 52. The data in the original differentially encoded signal can be derived from the output of an inverting amplifier 54 connected to the Ex-OR gate 52.

In order to determine if the transition is early E or late $\bar{E}$, one starts with the premise that the "correct" time for a transition in either channel is at the moment when the value of that channel is being strobed into the register 50. If the transition T is early, then the value entering the register 50 will be different to the first bit output (R3) of the pair which straddles the transition. If the transition is late, the opposite applies. At the time a transition T is detected, the value concerned is in the second stage (output X) of the register 50. By connecting an Ex-OR gate 56 shown in FIG. 6c to the register outputs R3 and X of FIG. 6a, it is possible to determine if the transition T is early E or late $\bar{E}$. The output of the gate 56 of FIG. 6c is high if the transition T is early E and low if it is late $\bar{E}$; see the waveform diagram R3⊕X in FIG. 7. In order to produce an indication of a transition being not early ($\bar{E}$), an inverting amplifier 58 is connected to the output of the gate 56.

To determine if the transition corresponds to a high or a low frequency, it is necessary to ascertain if the transition is positive or negative, a positive transition being a negative-to-positive one and a negative transition being a positive-to-negative one, and also what was the value of the other channel at the time. The value of the other channel at the nominal time of the transition T is held in the second stage, output R2, of the register 48 of FIG. 6a. The output R2 is applied to one input of an Ex-OR gate 60 to a second input of which is applied the half clock frequency $f_b/2$. The gate 60 inverts the output R2 on every other bit and this corresponds to the fact that the above-mentioned rules are inverted according to whether a transition has occurred in the I or Q channel; see the waveform R2⊕$f_b/2$ in FIG. 7. The output of the gate 60 is applied together with the output R3 to another Ex-OR gate 61 which has a high output (H) if the transition corresponds to a high frequency; see waveform H in FIG. 7.

In order to determine if the frequency corresponding to the transition detected by the gate 52 of FIG. 6b is "different" to that of the previous transition, the output (H) of the Exclusive-OR gate 61 of FIG. 6a is applied, via AND-gate 62 and OR-gate 64, to the data input D of a one bit register 65 which is clocked at the bit rate $f_b$. A Q output of the register 65 is applied to one input of an AND-gate 63 whose output is connected to another input of OR-gate 64. Indications of a transition (T) and of "not a transition" ($\bar{T}$) are applied respectively to second inputs of the AND-gates 62, 63. The gates 62, 63 and 64 provide that: if there had been a transition (T), the value of H is entered into the register 65, or if there has not been a transition ($\bar{T}$), the content of the register 65 (H' in FIG. 7) remains unaltered. Thus, the register 65 contains the value that H was at the time of the last transition. The Q output of the register 65 and the output of the gate 61 are applied to respective inputs of an Ex-OR gate 66. If the signal on the Q output is different to that on the output of the gate 61, then a high output is produced indicating a difference D; see waveform D in FIG. 7.

The four signals obtained by the logic operations described are:

T—a transition has occurred
E—the transition was early or late
H—it was a high or low frequency transition
D—the frequency of the transition was different to the previous transition.

These signals can be used to effect the necessary adjustments to the carrier and clock frequencies in fixed nudges to achieve zero crossings of the phase trajectory at the beginning of each bit period.

The operation of a logic circuit for obtaining fixed nudges of the carrier frequency can be summarised by the following Boolean algebra equations:

Advance carrier $A_c = T(E \oplus H)$ (Advance the carrier if a transition has occurred and it was either a late high-frequency transition or an early low-frequency transition).

Retard carrier $R_c = T\overline{(E \oplus H)}$ (Retard the carrier if a transition has occurred and it was either an early high-frequency transition or a late low-frequency transition).

The logic circuit of FIG. 6d for implementing these equations comprises an Ex-OR gate 70 to which the E and H signals are applied. The output of the gate 70 is applied to an AND-gate 72 and, via an inverter 74, to another AND-gate 76. The transition signal T is applied to both the gates 72 and 76. The gate 72 whose output is high for the advance carrier signal $A_c$ is connected to the gate electrode of a field effect transitor (FET) 78. The retard carrier signal $R_c$ is produced by the AND-gate 76 going high, this gate 76 being connected to the gate of an FET 80. The source-drain paths of the FETs 78 and 80 together with resistors 82 and 84 are connected in series between current supply rails +V and ground. Two other resistors 86, 88 are connected in series between the supply rails +V and ground. A presettable resistor 83 is connected between the junctions of the source-drain paths of the FETs 78 and 80 and of the resistors 86, 88. In response to the advance carrier $A_c$ and retard carrier $R_c$ signals, one of the FETs 78 and 80 will be conductive and a voltage change is applied to the carrier oscillator 30 which is implemented as a voltage controlled oscillator (VCO). For convenience of reference later, the circuit formed by the FETs 78, 80 and resistors 82, 83, 84, 86 and 88 will be identified by the numeral 89.

The adjustment of the frequency of the clock oscillator 44 can be described by the following Boolean algebra equations:

Advance clock $A_k = T.D.E.$ (Advance clock if a transition has occurred, its frequency is different to the previous one and it was early).

Retard clock $R_k = T.D.\overline{E}.$ (Retard clock if a transition has occurred, its frequency is different to the previous one and it was not early).

A logic circuit shown in FIG. 6a for implementing these equations comprises an AND-gate 90 to which the signals T and D are applied. The output of this gate 90 is connected to one input of AND-gates 92, 94. A second input of the gate 92 is connected to the output of the Ex-OR gate 56 which provides the E signal and a second input of the gate 94 is connected to the inverting amplifier 58 which provides the $\overline{E}$ signal. The outputs of the gates 92 and 94 are connected to the gate electrodes of respective FETs 96, 98 which are included in a circuit 100 which is of similar arrangement to the circuit 89 and accordingly will not be described in detail. In response to one or other of the FETs 96, 98 being rendered conductive, an appropriate control voltage is applied to the clock oscillator 44 which may also be a VCO.

Referring now to the proportional nudge demodulator circuit shown in FIGS. 8a–f, certain parts are the same as in FIGS. 6a–d and for the sake of consistency have been referred to by the same reference numerals. Also, in the interests of brevity, they will not be described again. FIG. 9 shows various signal waveforms which occur in FIGS. 8a–d.

Figures 8A, 8B, 8C, 8D, 8E, 8F:
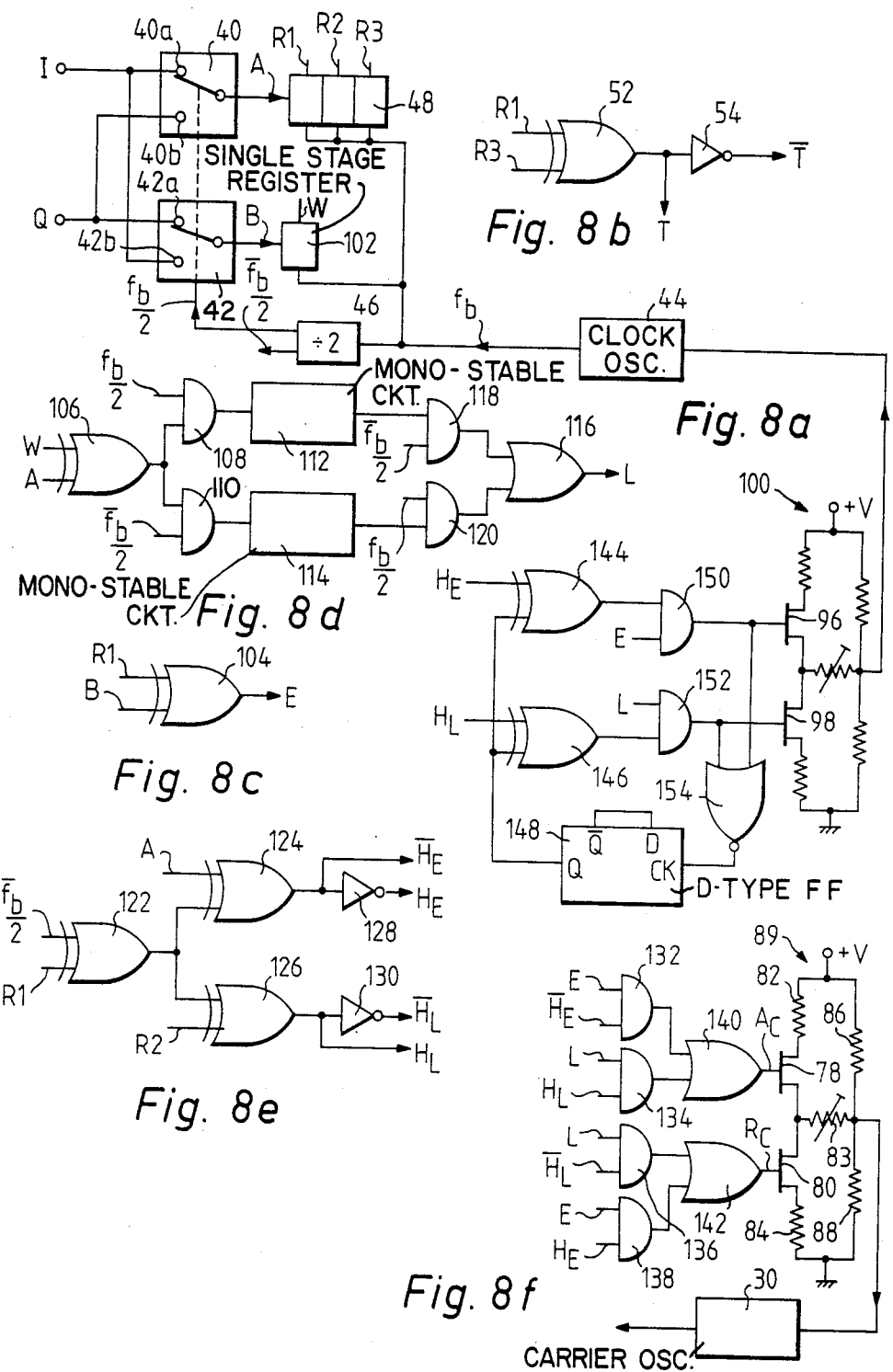
FIGS. 8a–8f illustrate schematically a demodulator circuit which can apply phase corrections for errors in carrier and/or clock freuqencies in amounts proportional to the errors in the transition times (otherwise termed proportional nudges)
Figure 9:
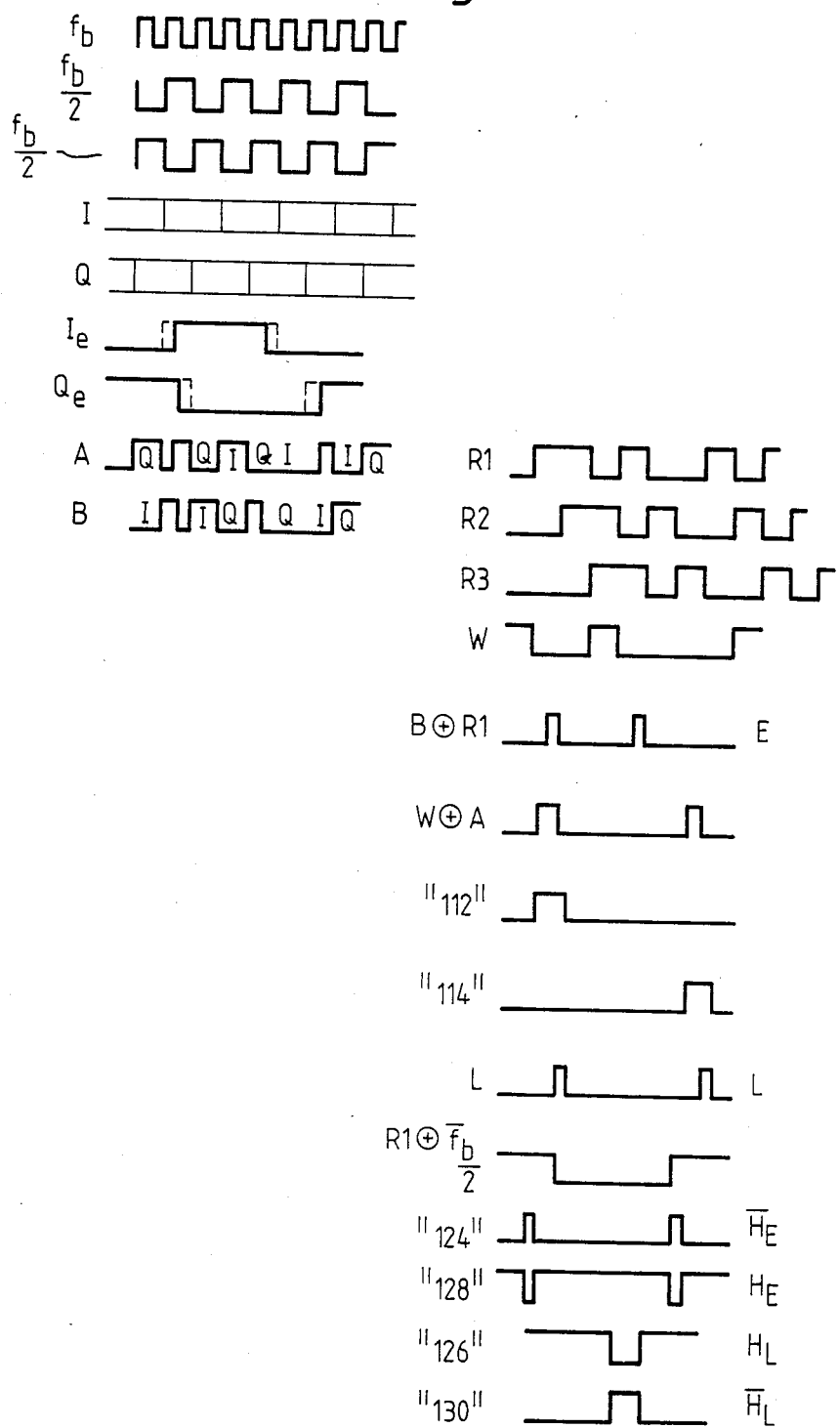
FIG. 9 shows diagrammatically a series of waveforms which serve to facilitate the understanding of the operation of the demodulator circuit shown in FIGS. 8a–8f.

In FIG. 8a, the output B of the switch is connected to a single stage register 102 which is strobed at the clock or bit frequency $f_b$. The register 102 has an output W.

In the described implementation, the logic circuits for producing proportional nudges of the carrier and clock frequencies require as inputs the signals T—transition, E—transition early, L—transition late, $H_E$—high frequency early, $\overline{H}_E$—not high frequency early (e.g. low frequency early), $H_L$—high frequency late, and $\overline{H}_L$—not high frequency late (e.g. low frequency late).

The transition T and the data signal are derived as described previously with reference to FIGS. 6b and 7 using the Ex-OR gate 52 and the inverting amplifier 54 shown in FIG. 8b.

The transition early signal E can be derived by comparing the eye signal most recently stored in the register 48, output R1, with the transition on the output of the switch 42, signal B. This is done using an Ex-OR gate 104 of FIG. 8c. It will be noted from FIG. 9 that the output signal is high only for the periods of time that the $I_e$ and $Q_e$ signals are early.

The transition late signal L is derived by applying the output W of the register 102 and the signal A to an Ex-OR gate 106 of FIG. 8d whose output is applied to one input of AND-gate 108 and 110. The half clock signal $f_b/2$ is applied to a second input of the AND-gate 108 whose output is applied to a monostable circuit 112. An antiphase half clock signal $\overline{f_b/2}$ is derived from the divider 46 and this is applied as a second input to the AND-gate 110 whose output is applied to a monostable circuit 114. The outputs from the monostable circuits 112 and 114 are applied alternately to an OR-gate 116 by means of two AND-gates 118 and 120 connected respectively to the monostable circuits 112 and 114, the gate 118 being enabled by the antiphase half clock signal and the gate 120 being enabled by the half clock signal. The late signal L appears on the output of the OR-gate 116. The waveforms at the outputs of the Ex-OR gate 106, the monostable circuits 112 and 114 and the OR-gate 116 are shown in FIG. 9.

The $H_E$, $\overline{H}_E$, $H_L$ and $\overline{H}_L$ signals are derived by considering the signal A and the outputs R1 and R2 of the register 48. The output R2 relates to the strobing of one of the channels I and Q into the register 48 and the output R1 relates to the strobing of the other of the channels I and Q into the register 48. The output R1 and the antiphase half clock signal $\overline{f_b/2}$ are applied to an Ex-OR gate 122 of FIG. 8e. The output of the gate 122 is compared with the A signal in an Ex-OR gate 124 and with the output R2 in an Ex-OR gate 126. The output of the gate 124 when high provides $\overline{H}_E$ and when low provides, via an inverter 128, the output $H_E$. The output of the gate 126 when high provides $H_L$ and when low provides, via an inverter 130, the output $\overline{H}_L$.

The proportional nudging of the carrier oscillator 30 under the various conditions described is derived by connecting the signals E and $\overline{H}_E$ to a first AND-gate 132 of FIG. 8f, the signals L and $H_L$ to a second AND-gate 134, the signals L and $\overline{H}_L$ to a third AND-gate 136 and the signals E and $H_E$ to a fourth AND-gate 138. The outputs of the first and second AND-gates 132, 134 are connected via an OR-gate 140 to the gate electrode of the "advance carrier" FET 78 of the bridge circuit 89 and the outputs of the third and fourth AND-gates 136, 138 are connected via an OR-gate 142 to the gate electrode of the "retard carrier" FET 80. Depending on which of the FETs is conductive, an appropriate control voltage is applied to the carrier oscillator 30.

The circuit for applying a proportional nudge to the clock oscillator 44 comprises two Ex-OR gates 144 and 146 as shown in FIG. 8a. The signals $H_E$ and $H_L$ are applied respectively to the gates 144 and 146, the other input of each of which is connected to the Q output of a D-type flip-flop 148 whose data input D is connected to the $\overline{Q}$ output, thus, in operation causing the Q output to be alternately high and low as the flip-flop 148 is strobed. The signal E and output of the gate 144 are applied as respective inputs to an AND-gate 150 which, when high, provides an "advance clock" signal to the gate electrode of the FET 96 of the circuit 100. The signal L and the output of the gate 146 are applied as respective inputs to an AND-gate 152 which, when high, provides a "retard clock" signal to the gate electrode of the FET 98. The strobe signal for the D-type flip-flop 148 is derived from a NOR-gate 154 whose inputs are connected respectively to the outputs of the AND-gates 150 and 152.

I claim:

1. A demodulator for digital input signals, comprising means for deriving correction signals for clock and carrier oscillators of a direct demodulator receiver, the oscillators supplying respective signals for demodulation of a digital input signal, the deriving means including means for comparing times of zero crossings at outputs of two orthogonal channels of said direct demodulator receiver with nominal times at which said crossings should occur.

2. A demodulator as claimed in claim 1, further comprising means for determining the occurrence of the zero crossings at the outputs of said two orthogonal channels and means for applying said corrections subsequent to the occurrence of the zero crossings to said clock and carrier oscillators.

3. A demodulator as claimed in claim 2, wherein said correction applying means applies phase corrections of a size related to the time errors in the zero crossings.

4. A demodulator as claimed in claim 3, wherein said correction applying means includes means for advancing or retarding said carrier oscillator according to the following function of variables in one channel: if the zero crossing is early and
 (1) the deviation frequency is low, advance
or
 (2) the deviation frequency is high, retard,
if the zero crossing is late and
 (3) the deviation frequency is low, retard,
or
 (4) the deviation frequency is high, advance;
and the inverse of these rules for zero crossings in the other channel.

5. A demodulator as claimed in claim 3, wherein said correction applying means includes means for advancing and retarding at least one of said clock and carrier oscillators only if the zero crossing corresponds to a deviation frequency of the opposite sign compared with that corresponding to the previous correction.

6. A demodulator as claimed in claim 4, wherein said correction applying means includes means for advancing and retarding at least one of said clock and carrier oscillators only if the zero crossing corresponds to a deviation frequency of the opposite sign compared with that corresponding to the previous correction.

7. A direct demodulator receiver, comprising: an input for a data signal modulated on a carrier, means for providing a pair of quadrature related channels wherein said data signal is mixed down to baseband, means for hard limiting the baseband signal in each said channel and a carrier and clock recovery circuit having inputs coupled to said channels for receiving said hard limited baseband signals, said carrier and clock recovery circuit comprising means for deriving correction signals for clock and carrier oscillators by comparing the times of the zero crossings in said channel with the nominal times at which these crossings should occur.

8. A demodulator for digital input signals, comprising:
 means for deriving correction signals for clock and carrier oscillators of a direct demodulator receiver, the oscillators supplying respective signals for demodulation of a digital input signal, the deriving means including means for comparing times of zero crossings at outputs of two orthogonal channels of said direct demodulator receiver with nominal times at which the zero crossings should occur;
 means for determining the occurrence of the zero crossings at the outputs of the two orthogonal channels, and
 means for applying said corrections subsequent to the occurrence of the zero crossings to the clock and carrier oscillators, the correction applying means including means for applying phase corrections in the form of fixed nudges related to time errors in the zero crossings.

9. A demodulator as claimed in claim 8, wherein said correction applying means includes means for advancing or retarding said carrier oscillator according to the following function of variables in one channel: if the zero crossing is early and
 (1) the deviation frequency is low, advance,
or
 (2) the deviation frequency is high, retard, if the zero crossing is late and
 (3) the deviation frequency is low, retard,
or
 (4) the deviation frequency is high, advance; and the inverse of these rules for zero crossings in the other channel.

10. A demodulator as claimed in claim 8, wherein said correction applying means includes means for advancing and retarding at least one of said clock and carrier oscillators only if the zero crossing corresponds to a deviation frequency of the opposite sign compared with that corresponding to the previous correction.

11. A demodulator for digital input signals, comprising:
 means for deriving correction signals for clock and carrier oscillators of a direct demodulator receiver, the oscillators supplying respective signals for demodulation of a digital input signal, the deriving means including means for comparing times of zero crossings at outputs of two orthogonal channels of said direct demodulator receiver with nominal times at which the zero crossings should occur;
 means for determining the occurrence of the zero crossings at the outputs of the two orthogonal channels, and
 means for applying said corrections subsequent to the occurrence of the zero crossings to said clock and carrier oscillators, said correction applying means including means for advancing and retarding at least one of said clock and carrier oscillators only if the zero crossing corresponds to a deviation frequency of the opposite sign compared with that corresponding to the previous correction.

* * * * *